March 23, 1965 G. L. ATHERHOLT, SR 3,174,765
NON-ROTATING PNEUMATIC CHUCK ACTUATOR
Filed Nov. 5, 1962 2 Sheets-Sheet 1
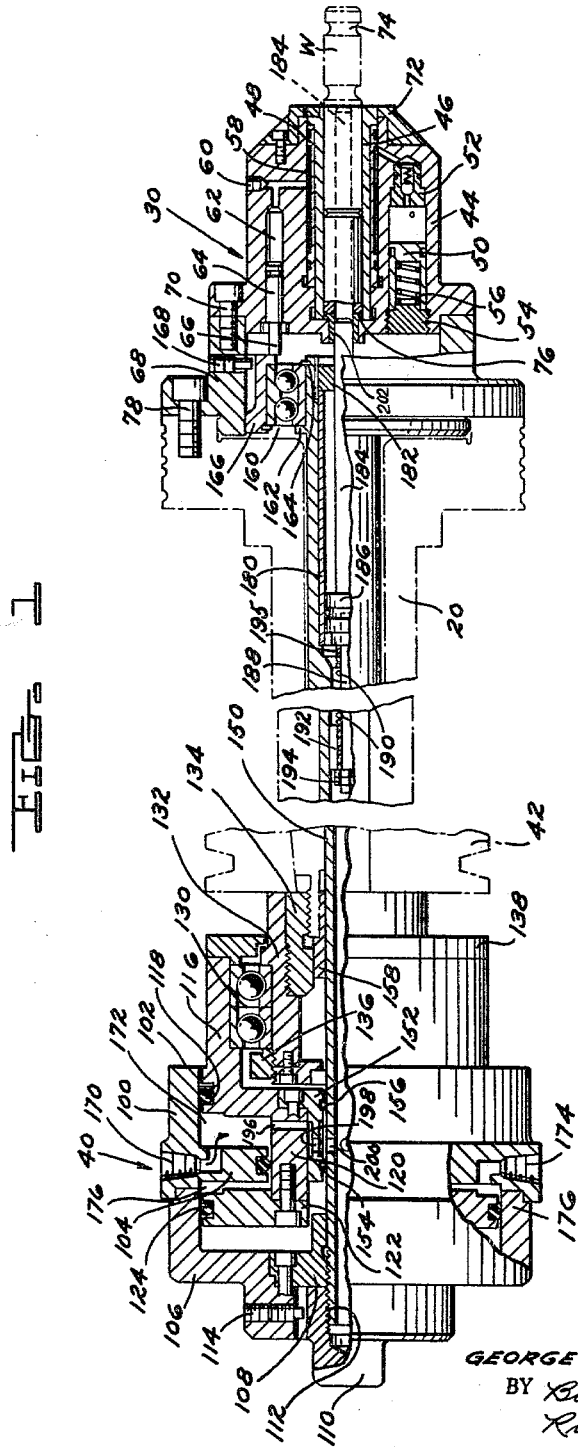
INVENTOR.
GEORGE L. ATHERHOLT, SR.
BY Barnes, Kisselle,
Raisch & Choate
ATTORNEYS March 23, 1965 G. L. ATHERHOLT, SR 3,174,765
NON-ROTATING PNEUMATIC CHUCK ACTUATOR
Filed Nov. 5, 1962 2 Sheets-Sheet 2
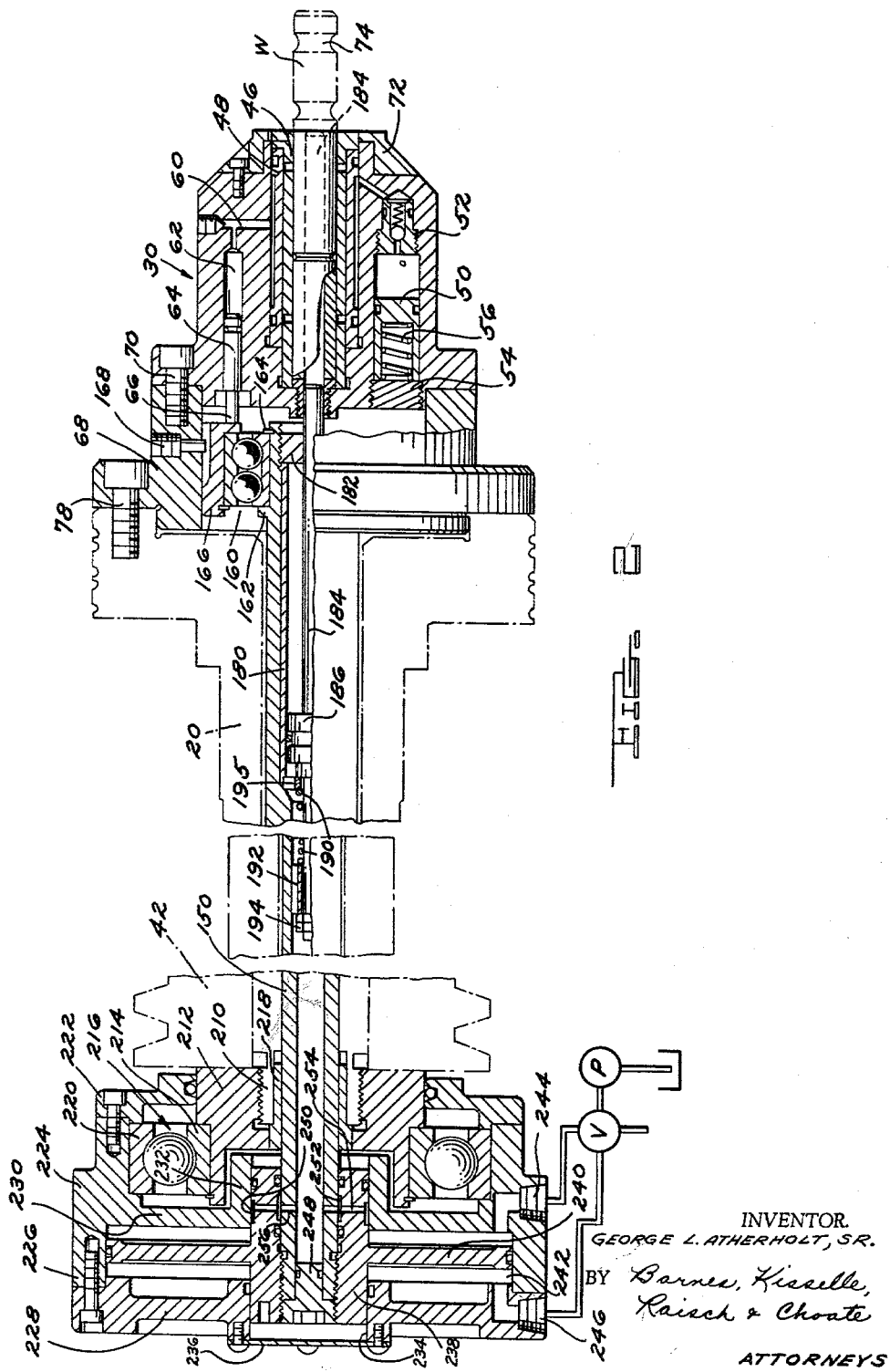
INVENTOR.
GEORGE L. ATHERHOLT, SR.
BY Barnes, Kisselle,
Raisch & Choate
ATTORNEYS

United States Patent Office 3,174,765
Patented Mar. 23, 1965

3,174,765
NON-ROTATING PNEUMATIC CHUCK
ACTUATOR
George L. Atherholt, Sr., Warren, Mich., assignor to
A and C Engineering Co., Warren, Mich., a corporation of Michigan
Filed Nov. 5, 1962, Ser. No. 235,346
13 Claims. (Cl. 279—4)

This invention relates to a non-rotating, pneumatic chuck actuator and more particularly to a pneumatic-type chuck operating device in which a piston is movable relative to its cylinder, one of these members being mounted on the end of a work rotating spindle opposite the chuck and the other member being connected to the chuck by means of a thrust tube extending along the axis of the spindle.

Examples of this type of mechanism utilized for a conventional collet chuck are found in U.S. patents, Nos. 2,726,090 to Williams, dated December 6, 1955, and 2,886,007 to Manchester, dated May 12, 1959.

It is an object of the present invention to provide an improved chuck actuator device with simplified bearing arrangements and sealing arrangements and also a chuck actuator which can be utilized in connection with a pressure chuck of the expansible type such as shown for example, in the U.S. patent to Atherholt, No. 2,744,756, dated May 8, 1956.

Another object of the invention is the provision of a fluid-operated part ejector for a fluid operated chuck which can be operated in conjunction with the chuck actuator.

A further object is the provision of a chuck actuator and part ejector which has a very short dimension at the rear of the spindle to allow the least interference with the normal accessories of the machine and to permit support by a single bearing race assembly.

Other objects and features of the invention relating to details of construction and operation will be apparent in the following description and claims.

Drawings accompany the disclosure and the various views thereof may be briefly described as:

FIGURE 1, a sectional view of an assembly of a chuck actuator and part ejector, wherein the piston and cylinder and tube actuator are stationary parts relative to the rotating chuck.

FIGURE 2, a modified type of construction, which has a much shorter dimension and a simplified piston-cylinder construction wherein all outside parts are stationary, both rotatably and axially.

Referring to FIGURE 1, a lathe headstock spindle 20 is shown diagrammatically holding, at the right-hand end, a chuck mechanism 30 and at the left-hand end a chuck actuating mechanism 40. The spindle is mounted in suitable supporting bearings (not shown) and driven by a pulley sheave 42.

The particular structure shown in FIGURE 1 is what might be called a heavy-duty structure and at the right-hand end the chuck 30 comprises a housing 44 which contains a steel expansion sleeve 46 surrounded by a nylon expansion sleeve 48. This particular structure is provided to afford greater usual radial expansion so that the chuck has a greater capacity or versatility. To do this, the inner sleeve 46 is sometimes split to give it a greater expansion characteristic. A suitable fluid loss accumulator piston 50 is provided behind a undirectional check valve 52 for replenishment of expansion fluid. A plug 54 holds the piston 50 in place and serves as a seat for spring 56.

In the operation of the expansible chuck pressure is transmitted to the expansion chamber 58 through a passage 60 and from a cylinder bore 62 in which a suitable piston 64 is positioned. This piston is actuated by a plunger extension 66. The chuck body 44 is held on to an annular housing 68 by bolts 70, and it will be seen that the cylinders 46 and 48 are held in place by a nose ring 72. A work part W is positioned in the chuck for the purpose of having ball race rings 74 formed therein, but it will be understood that any particular part may be held in the chuck by the fluid expansion in the chamber 58. In the rear of the cylinder 46 is a small collet ring 76 which carries one end of an ejector rod to be later described. The annular housing 68 is held by bolts 78 to the spindle 20.

Turning now to the left-hand end of the structure and the actuating unit 40, an outer rotationally stationary housing or cylinder 100 joins with a closing end 106 which carries internally a ring flange 108 to form a backing for a rotatable plug 110 having an internal thread 112. The plug 110 can rotate in the body 106 and is locked in place by a screw plug 114. The remainder of the piston-cylinder assembly is completed by a circular body 116 which is sealed at 118 for sliding seal with the interior of ring 100, the body 116 extending axially at 120 within a flange 104 on cylinder 100 and being completed by a piston disc 122 bolted to the extension 120 and sealed at 124 for sliding relationship to the interior of the cylinder end 106. The assembly 40 is mounted by a rotary and thrust bearing 130 on a cylindrical shell 132 moving with the spindle and connected thereto by an internally and externally threaded ring 134. A threaded retaining ring 136 mounts the bearing 130 on the cylindrical shell 132, the other end of the bearing being held axially by a ring 138 secured to body 116.

Extending between the chuck end 30 and the actuating end 40 is an actuator tube 150, this tube having a slightly increasing diameter as it progresses through the spindle 20. The left-hand end of the tube is threaded and engaged with the adjusting plug 110 while being mounted in the guide ring 108. The plug 110 closes the left-hand end of the tube 150 and a sealing ring 152 mounted on the piston 116 seals the surface of the tube at spaced axial points 154 and 156. A mounting bushing 158 surrounds the tube 150 within the ring 134.

The tube is supported at the other end by a rotary and thrust bearing element 160 which is suitably affixed to the end of the tube by a flange 162 at one side and a locking ring 164 at the other. The outer race of the bearing is held in a ring 166 which is similarly flanged and locked, this ring being held against rotation relative to ring housing 68 by a screw plug 168. It will be noted that the ring 166 bears against the push rod 66 of piston 64. Parts 116, 152, 120, and 122 collectively may be termed a piston member. Parts 152 and 120 cooperate to form a hub portion of the piston member surrounding a portion of tube 150.

It will now be seen that in the operation of the chuck the application of pressure through a pressure port 170 in cylinder 100 directs pressure into chamber 172, thus urging the cylinder and the attached actuator tube 150 to the left. This releases pressure on the push rod 66 and the chuck, allowing the part W to be removed. On the other hand, pressure directed into port 174 directs pressure to the left-hand side of flange 104 into chamber 176 which urges the cylinder assembly 100–106 to the right, thus shifting the actuator tube 150 to the right and placing pressure on the push rod 66 and the piston 64, thereby increasing pressure in the hydraulic expansion chuck chamber 58 causing a locking of the work part. The actuating fluid through ports 170 and 174 can be air from any suitable pressure source.

A work ejector element is also associated with the actuator tube 150. This is accommplished through the use of a cylinder liner element 180 in the large portion of the tube 150, this liner element being retained at one end by a guide ring 182 which serves as a guide for an ejection piston rod 184 extending from an ejection piston 186 having a suitable slide seal within the cylinder 180. A trailing piston rod 188 serves as a support for a return spring 190 suitably retained at the rear end by a collar 192 and nuts 194. The forward end of the spring 190 bears against an open ring assembly 195 supported at the left-hand side of piston 186.

Actuating fluid for piston 186 comes from chamber 172 through radial passages or porting 196 in part 120, 198 in ring 152 and 200 in the sleeve 150. Thus, pressure in port 170 not only urges the housing 100–106 and the actuating sleeve 150 to the pressure release position for piston 64 but also sends part ejector pressure through the center of the tube 150 to the piston 186 which thrusts forward the rod 184 to eject the part as shown by the dotted line position of the part 184 at the extreme right-hand end of the drawing. Piston rod 184 has a rotating slip fit in a small nipple bushing 202 at the center bore of housing 30 to permit the necessary relative motion between the parts.

Thus, there is above described an actuator unit for a hydraulic chuck assembly and in conjunction therewith a part ejector which operates under the same impulse pressure as the part release mechanism. In addition, practically all of the actuating elements, supported by a single thrust bearing, are in stationary relationship to the machine, that is, non-rotating, and only the minimum parts that must necessarily rotate are associated with the rotating spindle.

In FIGURE 2, a modification is shown wherein the right-hand end of the drawing showing the chuck 30 is the same as that of FIGURE 1 and similarly the spindle 20 is the same. The mechanism for the actuator, however, at the left-hand end of the drawing is considerably altered from that shown in FIGURE 1. The spindle 20 carries a threaded extension 210 on which is mounted a threaded bearing ring 212 carrying the inside race 214 of a bearing assembly 216. A slip sleeve or bushing 218 lies between the parts 210, 212 and the exterior surface of the tube 150. The outer race 220 of the bearing assembly 216 is held in place by a flange ring 222 having a suitable seal relationship at the inner radius with the part 212. The flange 222 is mounted on a circular housing element 224 which locates the outer bearing race 220, this housing 224 having an axially extending ring portion 226 cooperating with an end plate 228 which is bolted thereto to provide a pressure cylinder. The housing 224 also has an inwardly extending wall 230 with a return flange 232 which forms, in conjunction with a circular opening in plate 228, a central axial bore 234 closed by a dust shield 236.

Within the bore 234 is a piston hub 238 each end of which is mounted respectively within the flange 232 of housing 224 and the plate 228. A radial flange 240 on the hub 238 has a sliding seal relationship with the internal wall of the ring portion 226 of the housing 224 forming a piston-cylinder assembly. The cylindrical recess 242 in which this radial flange moves is open to fluid pressure ports 244 and 246 on opposite sides. The left-hand end of the actuator tube 150 is threaded on the inside of hub 238 and locked by a screw plug 248.

On the right-hand side of the hub 238 on the outer surface is an annular shallow groove 250 radially opposed to an annular groove 252 on the inner surface of the hub surrounding the tube 150. These annular grooves are connected by radial passages or ports 254 and the interior of the tube 150 is connected to annnular groove 252 by radial passages 256.

In the operation of the structure illustrated in FIGURE 2, pressure in port 246 leading to the left-hand side of cylindrical recess 242 and piston plate 240 urges the actuator tube 150 to the right, thus shifting push rod 66 and piston 64 to a pressure position to hold a work part. When it is desired to release and eject a work part, pressure is directed to port 244 and the right-hand side of piston plate 240 to cause the piston plate and hub 238 to shift to the left, thus relieving pressure on piston 64. Upon a certain predetermined travel of the hub 238, the pressure on the right-hand side of piston plate 240 will pass through the porting provided by annular passage 250, the radial passages 254, the annular passage 252 and the radial passages 256 to the interior of tube 150 where it can act on piston 186 causing an ejection of the work part. Spring 190 will cause return of the piston 186 when pressure is relieved in port 244. Thus, with an extremely short axial dimension an actuating assembly is provided which permits chuck actuation and release together with simultaneous work ejection suitable timed with the release action.

Reference is made to my co-pending United States patent application Serial No. 233,838, filed October 29, 1962, wherein related subject matter is disclosed and claimed.

I claim:

1. In a lathe head stock spindle mechanism having a chuck operable to engage and release a workpiece responsive to movements of an actuating tube within said mechanism and having a workpiece ejector actuated by pressure within said tube, improved structure comprising, an actuating assembly having a cylinder member and a piston member which are pressure actuated, means providing between said spindle and one of said members a bearing connection which facilitates rotation of said spindle relative to said assembly bodily, the other of said members being operably connected to said tube so that said tube responsive to relative movement of said members actuates said chuck, said tube and one of said members being provided with porting operative to transmit pressure from the interior of said cylinder member to the tube interior responsive to pressure actuation of said assembly in one direction, whereby to actuate said ejector.

2. The improved structure defined in claim 1 wherein said piston member has a hub portion disposed around a portion of said tube, said porting being provided in said hub portion and said tube portion.

3. The improved structure defined in claim 2 wherein said porting is closed by a portion of said assembly in one relative position of said members, and said porting is opened responsive to a predetermined relative movement between said members toward another relative position thereof.

4. The improved structure defined in claim 3 wherein said hub portion is disposed within a bore in said cylinder, said porting in said hub being carried into and out of registry with portions of said bore responsive to relative movement of said members between said positions thereof, whereby to close and open said porting respectively.

5. The improved structure defined in claim 2 wherein said porting intercommunicates said cylinder and tube interior independently of the relative position of said members.

6. The improved structure defined in claim 1 wherein said other of said members is provided with said porting.

7. The improved structure defined in claim 6 wherein said bearing connection is provided between said spindle and said cylinder member.

8. The improved structure defined in claim 1 wherein said porting is provided in the same member as that having said bearing connection to said spindle.

9. The improved structure defined in claim 8 in which said piston member has said bearing connection and porting.

10. In a lathe head stock spindle mechanism having a chuck operable to engage and release a workpiece responsive to movements of an actuating tube within said spindle and having a workpiece ejector actuated by pressure within said tube, improved structure comprising,
- a cylinder member and a piston member which are relatively movable responsive to pressure admitted to the interior of said cylinder member,
- said tube having a substantially fixed non-rotatable connection with one of said members so that said members and tube cooperate to provide a chuck actuating assembly,
- means providing between the other of said members and said spindle a bearing connection which facilitates rotation of said spindle relative to said assembly bodily,
- and means operable responsive to pressure actuation of said assembly in one direction to admit pressure into the tube interior whereby to actuate said ejector.

11. The improved structure defined in claim 10 wherein spring means are provided within the interior of said tube, said spring means being operable responsive to relief of pressure in said tube to retract said ejector.

12. The improved structure defined in claim 10 wherein said bearing connection is provided between said spindle and piston member.

13. The improved structure defined in claim 10 wherein said bearing connection is provided between said spindle and cylinder member.

References Cited in the file of this patent

UNITED STATES PATENTS

| | | |
|---|---|---|
| 1,964,937 | Dumser | July 3, 1934 |
| 2,972,486 | Better | Feb. 21, 1961 |
| 3,025,646 | Thompson | Mar. 20, 1962 |

FOREIGN PATENTS

| | | |
|---|---|---|
| 1,018,696 | Germany | Oct. 31, 1957 |